(12) United States Patent
Liu et al.

(10) Patent No.: US 10,542,504 B1
(45) Date of Patent: Jan. 21, 2020

(54) WIRELESS COMMUNICATION SYSTEM AND METHOD

(71) Applicant: DELTA ELECTRONICS, INC., Taoyuan (TW)

(72) Inventors: Yin-Chang Liu, Taoyuan (TW); Hsuan-Lin Cheng, Taoyuan (TW); Chih-Wei Wang, Taoyuan (TW); Chun-Yi Lu, Taoyuan (TW); Ya-Chen Chuang, Taoyuan (TW); Chia-Yu Chen, Taoyuan (TW); Tsung-Han Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/232,748

(22) Filed: Dec. 26, 2018

(30) Foreign Application Priority Data

Oct. 8, 2018 (CN) .......................... 2018 1 1168115

(51) Int. Cl.
| | |
|---|---|
| *H04J 11/00* | (2006.01) |
| *H04W 52/42* | (2009.01) |
| *H04W 52/24* | (2009.01) |
| *H04W 16/28* | (2009.01) |

(52) U.S. Cl.
CPC ........... *H04W 52/42* (2013.01); *H04W 16/28* (2013.01); *H04W 52/248* (2013.01)

(58) Field of Classification Search
CPC ....... H04B 7/022; H04W 48/20; H04W 88/08
USPC .............................................. 455/422.1, 13.4
See application file for complete search history.

(56) References Cited

U.S. PATENT DOCUMENTS 10,389,465 B2 * 8/2019 Allen ..................... H04J 11/003

* cited by examiner

*Primary Examiner* — Tu X Nguyen
(74) *Attorney, Agent, or Firm* — Kirton McConkie; Evan R. Witt

(57) ABSTRACT

A wireless communication system and method is provided. The wireless communication system includes a wireless transceiver device and a processing device. The processing device includes a direction control module, a power adjusting module and a boundary setting module. The direction control module controls the scanning direction and generates a point direction information record according to each reference position respectively. The power adjusting module adjusts the transmitting power and generates a point power information record according to each reference position and the corresponding point direction information record respectively. The boundary setting module generates a boundary information record. The processing device controls the transmitting direction and the transmitting power according to the point direction information record(s), the point power information record(s) and the boundary information record, so as to limit a transmission of the wireless signal within a specific area.

23 Claims, 10 Drawing Sheets

1

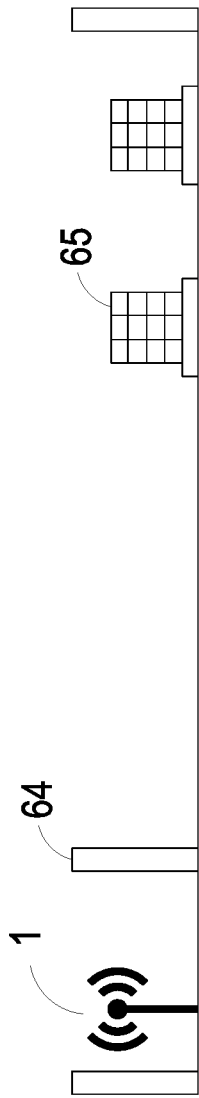
FIG. 5A
FIG. 5B
FIG. 5C

WIRELESS COMMUNICATION SYSTEM AND METHOD

CROSS-REFERENCE TO RELATED APPLICATION

This application claims priority to China Patent Application No. 201811168115.6, filed on Oct. 8, 2018, the entire content of which is incorporated herein by reference for all purposes.

FIELD OF THE DISCLOSURE

The present disclosure relates to a wireless communication system and method, and more particularly to a wireless communication system and method being able to limit the transmission of the wireless signal within a specific area.

BACKGROUND OF THE DISCLOSURE

Nowadays, wireless communication network has been extensively used in normal life. For security and management, it is an important topic to limit the transmission and access of the wireless signal within a specific area.

Conventionally, the permission area allowing access to wireless communication network is defined artificially. Whether the user is located in the permission area is examined according to the position of the user. However, the transmission of the wireless signal can't be limited within the permission area. Therefore, if the position of the user is unknown, it is hard to sure that the user can only receive the wireless signal in the permission area.

Therefore, there is a need of providing a wireless communication system and method in order to overcome the above drawbacks.

SUMMARY OF THE DISCLOSURE

An object of the present disclosure provides a wireless communication system and method. According to each reference position, the processing device of the wireless communication system generates corresponding point direction information record and point power information record respectively. The boundary information record is generated accordingly. In accordance with the point direction information record, the point power information record and the boundary information record, the processing device controls the wireless transceiver device to transmit the wireless signal with corresponding transmitting direction and transmitting power. Consequently, the transmission of the wireless signal is limited within a specific area.

In accordance with an aspect of the present disclosure, there is provided a wireless communication system. The wireless communication system includes a wireless transceiver device and a processing device. The wireless transceiver device is configured for transmitting a wireless signal with a transmitting power and a transmitting direction and detecting in a scanning direction. The processing device is connected with the wireless transceiver device. The processing device receives at least one reference position and includes a direction control module, a power adjusting module and a boundary setting module. The direction control module is configured for controlling the transmitting direction and the scanning direction. The direction control module controls the scanning direction and generates a point direction information record according to each of the at least one reference position respectively. The power adjusting module is configured for dynamically adjusting the transmitting power. The power adjusting module adjusts the transmitting power and generates a point power information record according to each of the at least one reference position and the corresponding point direction information record respectively. The boundary setting module receives the at least one reference position, a position of the wireless transceiver device, the point direction information record(s) and the point power information record(s), and the boundary setting module generates a boundary information record. The processing device controls the transmitting direction and the transmitting power according to the point direction information record(s), the point power information record(s) and the boundary information record, so as to limit a transmission of the wireless signal within a specific area.

In accordance with another aspect of the present disclosure, there is provided a wireless communication method. The wireless communication method includes steps of: (a) receiving at least one reference position; (b) controlling a scanning direction of a wireless transceiver device and generating a point direction information record according to each of the at least one reference position respectively; (c) adjusting a transmitting power of the wireless transceiver device transmitting a wireless signal and generating a point power information record according to each of the at least one reference position and the corresponding point direction information record respectively; (d) generating a boundary information record according to the at least one reference position, a position of the wireless transceiver device, the point direction information record(s) and the point power information record(s); and (e) controlling a transmitting direction and the transmitting power of the wireless transceiver device transmitting the wireless signal according to the point direction information record(s), the point power information record(s) and the boundary information record, and limiting a transmission of the wireless signal within a specific area.

The above contents of the present disclosure will become more readily apparent to those ordinarily skilled in the art after reviewing the following detailed description and accompanying drawings, in which:

BRIEF DESCRIPTION OF THE DRAWINGS

FIGS. 5A, 5B and 5C are schematic views showing the relative positions between the wireless transceiver device and the physical entity in different transmitting directions;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
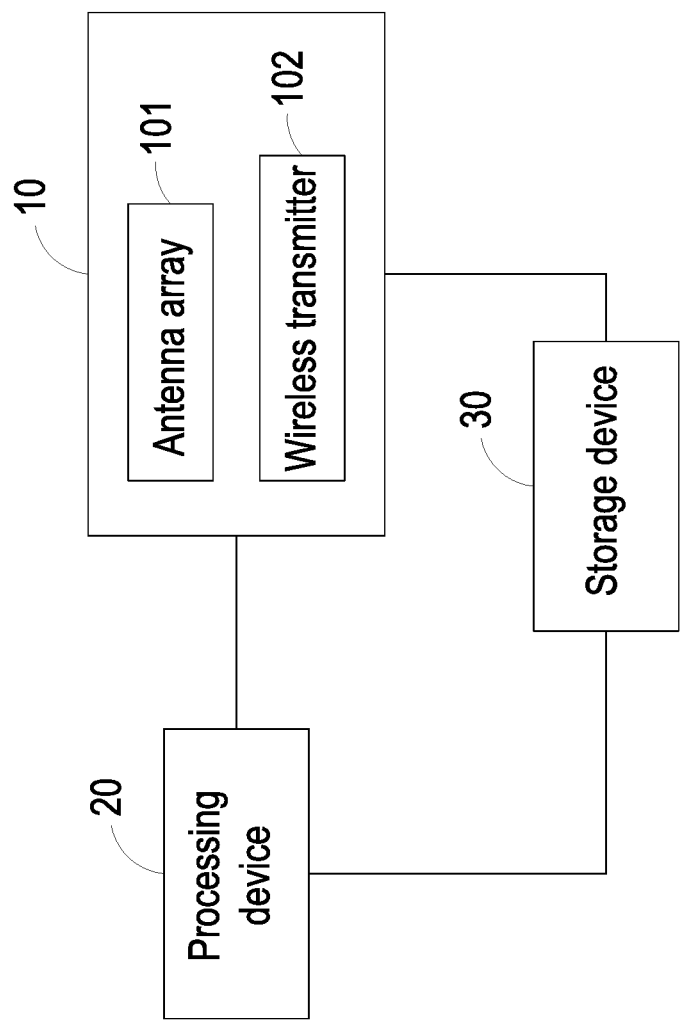
FIG. 1 is a schematic view illustrating a system architecture of a wireless communication system according to an embodiment of the present disclosure.
Figure 2:
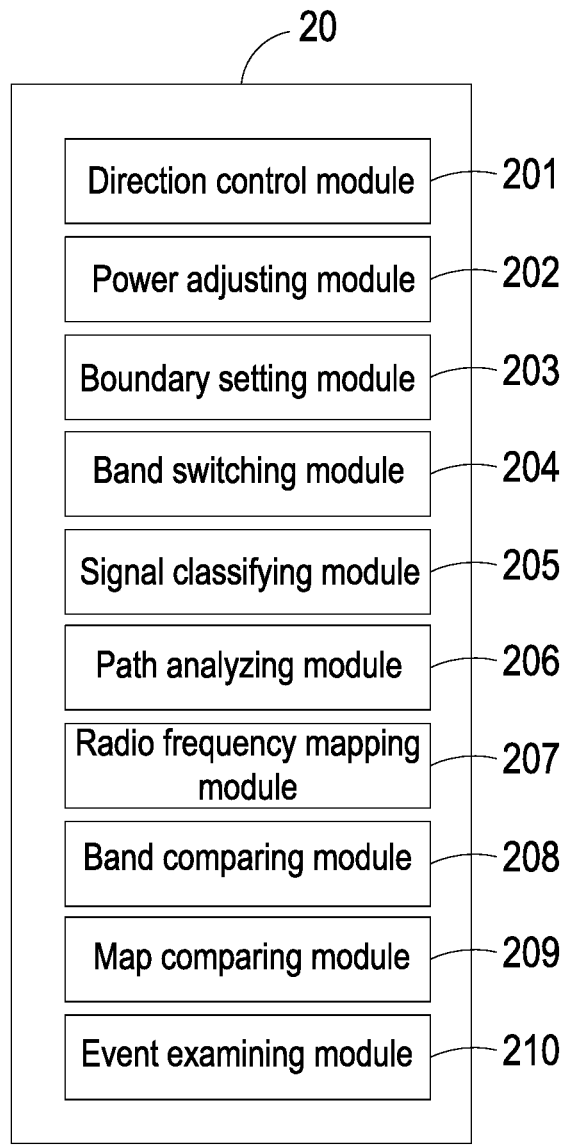
FIG. 2 is a schematic view illustrating a system architecture of the processing device of FIG. 1.

FIG. 1 is a schematic view illustrating a system architecture of a wireless communication system according to an embodiment of the present disclosure, and FIG. 2 is a schematic view illustrating a system architecture of the processing device of FIG. 1. As shown in FIGS. 1 and 2, the wireless communication system 1 includes a wireless transceiver device 10 and a processing device 20. The wireless transceiver device 10 is configured to transmit a wireless signal with a transmitting power and a transmitting direction and detect in a scanning direction. In an embodiment, the wireless transceiver device 10 includes an antenna array 101 and a wireless transmitter 102. The antenna array 101 is configured for detection, and the wireless transmitter 102 is configured to transmit the wireless signal. Preferably but not exclusively, the antenna array 101 includes a plurality of controllable phase array antennas or a plurality of directional antennas. It is noted that the wireless transmitter 102 can transmit the wireless signal by WiFi, BLE (Bluetooth Low Energy), Zigbee, LTE (Long-Term Evolution) or RFID (Radio Frequency Identification). The wireless transmitter 102 is not limited to transmit the wireless signal by the above-mentioned communication techniques.

The processing device 20 is connected with the wireless transceiver device 10 and receives at least one reference position. The processing device 20 includes a direction control module 201, a power adjusting module 202 and a boundary setting module 203. The direction control module 201 is configured to control the transmitting direction and the scanning direction of the wireless transceiver device 10. In accordance with each of the at least one reference position, the direction control module 201 controls the scanning direction of the wireless transceiver device 10 and generates a point direction information record respectively. The power adjusting module 202 is configured to dynamically adjust the transmitting power of the wireless transceiver device 10. In accordance with each of the at least one reference position and the corresponding point direction information record, the power adjusting module 202 adjusts the transmitting power and generates a point power information record respectively. The boundary setting module 203 receives the at least one reference position, the position of the wireless transceiver device 10, the point direction information record(s) and the point power information record(s) and generates a boundary information record. The processing device 20 controls the transmitting direction and the transmitting power according to the point direction information record(s), the point power information record(s) and the boundary information record, so as to limit the transmission of the wireless signal within a specific area.

In fact, the specific area can be regarded as a wireless transmission area, and the reference position can be regarded as a point of the wireless transmission area. According to each point, the processing device 20 generates the corresponding point power information record and point direction information record respectively. Taking a point as an example, the corresponding point power information record represents the transmitting power of the wireless transceiver device 10 transmitting the wireless signal to that point, and the corresponding point direction information record represents the direction of the wireless transceiver device 10 facing toward that point. When the wireless transceiver device 10 transmits the wireless signal toward any point, the processing device 20 can control the transmitting power of the wireless transceiver device 10 according to the corresponding point power information record and point direction information record. Therefore, the transmission of the wireless signal is limited between the wireless transceiver device 10 and the point. Moreover, the connecting lines of the reference positions (i.e., the connection lines of the points) can be regarded as the boundary of the wireless transmission area. The processing device 20 generates the boundary information record according to all the point power information record(s) and all the point direction information record(s). The boundary information record includes the direction information record and power information record corresponding to every position at the boundary of the wireless transmission area. Therefore, the processing device 20 can limit the transmission of the wireless signal inside the boundary of the wireless transmission area according to the boundary information record. Consequently, the processing device 20 controls the transmitting direction and the transmitting power of the wireless transceiver device 10 according to the point direction information record, the point power information record and the boundary information record, so as to limit the transmission of the wireless signal within the wireless transmission area. The wireless transmission area is defined by the reference positions and the connecting lines of the reference positions. Whether the physical boundary (e.g., wall) exists or not, the wireless communication system 1 can limit the transmission of the wireless signal within the specific area. It is sure that the user receives the wireless signal in the specific area only. The shape of the specific area is not limited, and the shape of the specific area can be irregular as well. By the direction control module 201 controlling the transmitting direction, the wireless transmission area is divided into plural minor areas. The data traffic, the limits to communication authority and the monitoring intensity in every minor area can be adjusted separately.

Figure 3B:
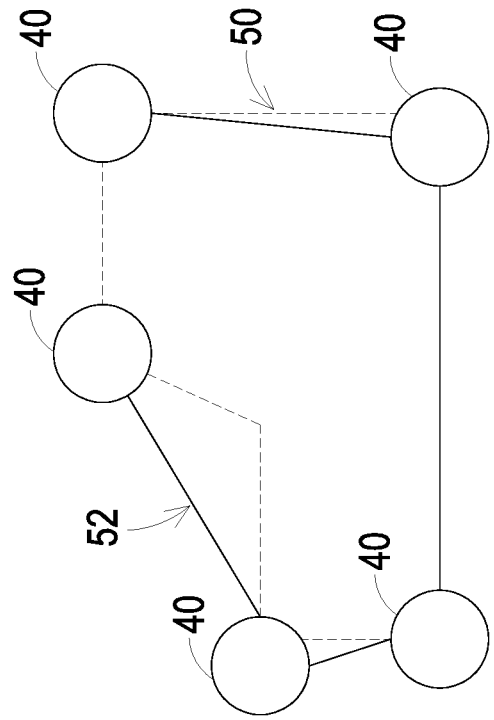
FIGS. 3A and 3B are schematic views showing the wireless communication system limiting the transmission of the wireless signal within a specific area.
Figure 3A:
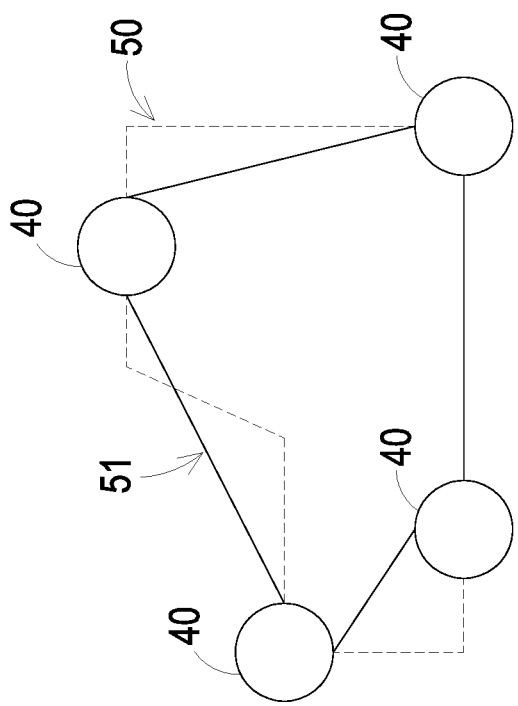

In addition, if the number of the reference positions increases, the sealed area defined by the reference positions and the connecting lines of the reference positions is more similar to the target wireless transmission area, and the wireless communication system 1 can limit the transmission of the wireless signal within the specific area more accurately. FIGS. 3A and 3B are shown as an example. FIGS. 3A and 3B are schematic views showing the wireless communication system limiting the transmission of the wireless signal within a specific area. The area depicted by the dashed lines is the target wireless transmission area 50. Compared with the first wireless transmission area 51 defined by four reference positions 40 and the connecting lines thereof in FIG. 3A, the second wireless transmission area 52 defined by five reference positions 40 and the connecting lines thereof in FIG. 3B is more similar to the target wireless transmission area 50.

Moreover, the source of the reference position is not limited. The reference position can be set by the user, acquired by receiving external signal, or acquired via the wireless transceiver device 10 detecting the external signal. In an embodiment, the wireless communication system 1 further includes at least one boundary setting device (not shown). The boundary setting device is located at the reference position and is configured to transmit the position signal. After the wireless transceiver device 10 receives the position signal, the direction control module 201 controls the wireless transceiver device 10 to detect all beam directions. The beam direction of detecting the signal with strongest energy is the direction of the wireless communication system 1 facing toward the boundary setting device. Consequently, the reference position is acquired. In an embodiment, the position signal transmitted by the boundary setting device presents the reference position. The wireless transceiver device 10 receives and provides the position signal to the processing device 20. Thus, the processing device 20 acquires the reference position via the position signal.

In an embodiment, the wireless communication system 1 further includes a storage device 30. The storage device 30 is configured to store the signal and information record generated and received by the wireless transceiver device 10 and the processing device 20. In an embodiment, the processing device 20 further includes a band switching module 204. The band switching module 204 is configured to switch the band of the wireless signal transmitted by the wireless transceiver device 10.

In an embodiment, the processing device 20 further includes a signal classifying module 205, a path analyzing module 206 and a radio frequency mapping module 207 for building the radio frequency map. The signal classifying module 205 receives at least one reflection signal through the wireless transceiver device 10 and classifies the reflection signals according to the signal characteristic. Preferably but not exclusively, the signal classifying module 205 classifies the reflection signals according to the transmitting power corresponding to the power of the reflection signal. The path analyzing module 206 receives and analyzes the classified reflection signals, and generates an analysis result. The radio frequency mapping module 207 receives the analysis result and generates the radio frequency map according to the analysis result. The radio frequency map is generated based on a radio frequency technology. In an embodiment, the reflection signal is generated from the wireless signal reflected by at least one physical entity. The analysis result presents the physical characteristic of the physical entity. Consequently, the physical entity in the transmission area of the wireless signal can be identified and located via the radio frequency map, and thus the area monitoring is realized.

In an embodiment, in order to enhance the accuracy of the radio frequency map, the direction control module 201 controls the wireless transceiver device 10 to transmit the wireless signal in plural directions respectively during the process of building the radio frequency map. Accordingly, the direction control module 201 controls the wireless transceiver device 10 to receive the reflection signal in the plural directions. In each of the plural directions, there are wireless signals with plural bands due to the switching of the band switching module 204. In each of the plural bands, the power adjusting module 202 controls the wireless transceiver device 10 to transmit the wireless signal with plural transmitting powers. In this embodiment, the processing device 20 further includes a band comparing module 208.

The band comparing module 208 receives the classified reflection signals, compares the reflection signals according to plural bands, and generates a contrast result. The radio frequency mapping module 207 receives the analysis result and the contrast result and generates the radio frequency map accordingly. Since the physical entity have different physical characteristics (e.g., transmittance and reflectance) relative to the signal with different bands, transmitting the wireless signals with plural bands is helpful for identifying the physical entity and generating more accurate radio frequency map.

Figure 4:
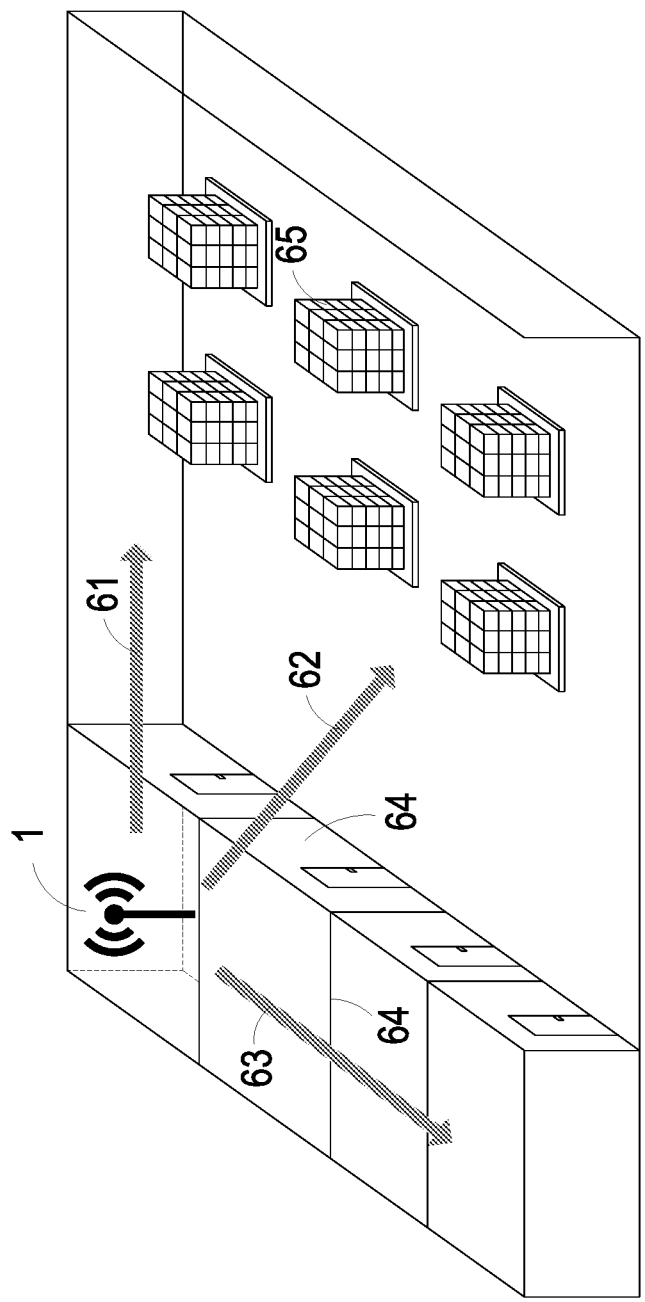
FIG. 4 is a schematic view showing a practical application environment of the wireless communication system of FIG. 1.
Figure 6A:
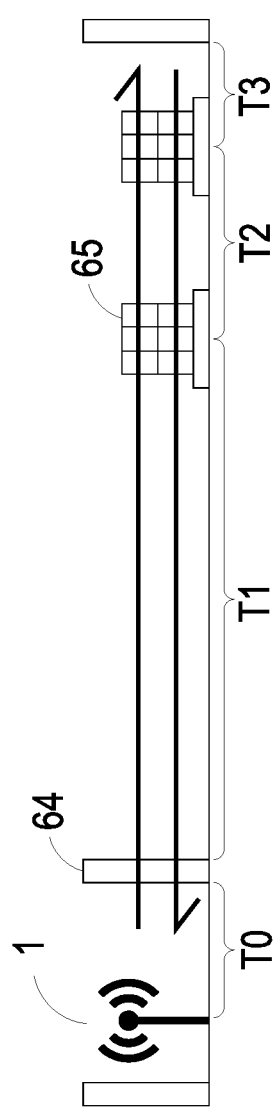
FIGS. 6A, 6B and 6C are schematic views showing the reflection signal received by the wireless transceiver device in the transmitting direction shown in FIG. 5A.
Figure 6B:
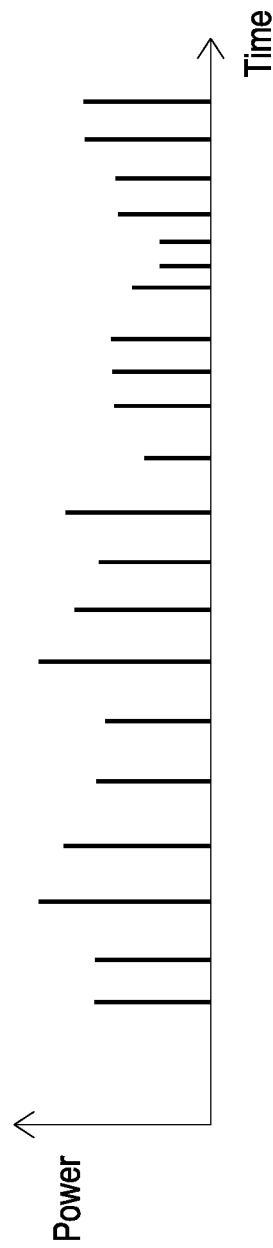
Figure 6C:
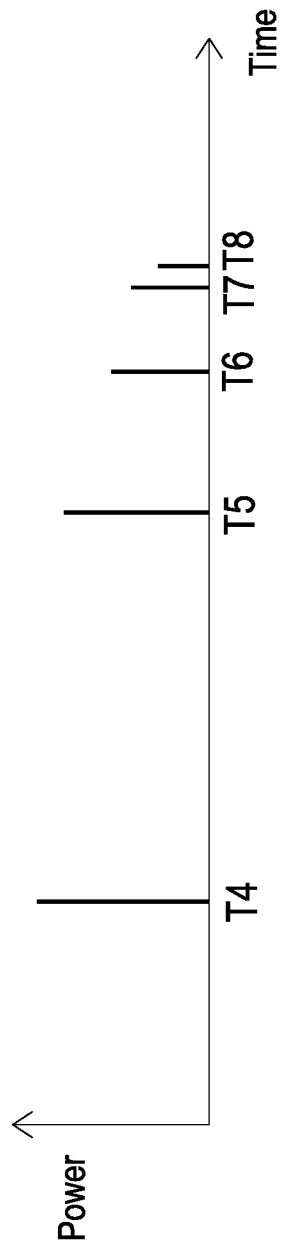

For clearly describing the process of building the radio frequency map, a practical application environment of the wireless communication system 1 is shown as an example. FIG. 4 is a schematic view showing a practical application environment of the wireless communication system of FIG. 1. FIGS. 5A, 5B and 5C are schematic views showing the relative positions between a wireless transceiver device and a physical entity at different transmitting directions. FIGS. 6A, 6B and 6C are schematic views showing the reflection signal received by the wireless transceiver device at the transmitting direction shown in FIG. 5A. As shown in FIG. 4, the wireless communication system 1 is disposed in a practical environment. In different transmitting directions of the wireless transceiver device 10, the number of the physical entity, the type of the physical entity and the relative position between the wireless transceiver device 10 and the physical entity are different. Accordingly, the reflection signals of different directions are different. Taking three transmitting directions 61, 62 and 63 in FIG. 4 as an example, FIGS. 5A, 5B and 5C show the relative positions between the wireless transceiver device 10 and the physical entity in the transmitting directions 61, 62 and 63 respectively. As shown in FIGS. 5A, 5B and 5C, in the transmitting directions 61, 62 and 63, the number of the wall 64 and the number of the article 65 are different, and the relative positions among the wireless transceiver device 10, the wall 64 and the article 65 are different as well. Consequently, the wireless transceiver device 10 receives different reflection signals in the three transmitting directions 61, 62 and 63.

After the wireless transceiver device 10 receives the reflection signal, the processing device 20 processes the reflection signal for building the radio frequency map. Taking the reflection signal of the transmitting direction 61 as an example, as shown in FIG. 6A, there are one wall 64 and two articles 65 in the transmitting direction 61. The time intervals T0, T1, T2 and T3 represent the time intervals of the wireless signal transmitting for various distances. Due to the difference of the physical characteristics of the wall 64 and the article 65, the wireless signal may reflect or/and transmit while arriving the wall 64 and the article 65. As shown in FIG. 6B, the wireless transceiver device 10 receives the reflection signals with different paths and transmitting powers at different time. According to the corresponding transmitting power of the reflection signal, the signal classifying module 205 classifies the reflection signals received by the wireless transceiver device 10. The path analyzing module 206 analyzes the classified reflection signals for acquiring the order of the reflection signals arriving the wireless transceiver device 10, and the path analyzing module 206 generates the result shown in FIG. 6C, where $T4=2T0$, $T5=2(T0+T1)$, $T6=2(T0+T1+T2)$, $T7=2(T0+T1+T2+T3)$ and $T8=2(T0+T1)$. Consequently, the processing device 20 obtains the relative position between the wall 64 and the wireless transceiver device 10 and the relative position between the article 65 and the wireless transceiver device 10 in accordance with the order of the reflection signals.

In an embodiment, the processing device 20 further includes a map comparing module 209 and an event examining module 210 for comparing and examining the radio frequency map. The map comparing module 209 receives and compares the plural radio frequency maps generated by the radio frequency mapping module 207, and the map comparing module 209 generates a comparing result. The event examining module 210 receives the comparing result and acquires the variation of the position of the physical entity according to the comparing result. By comparing the radio frequency maps, the position variation of the physical entity in the transmission area of the wireless signal is acquired, and even the moving path can be obtained by several times of position varying, which enhances the intensity of area monitoring.

Figure 7:
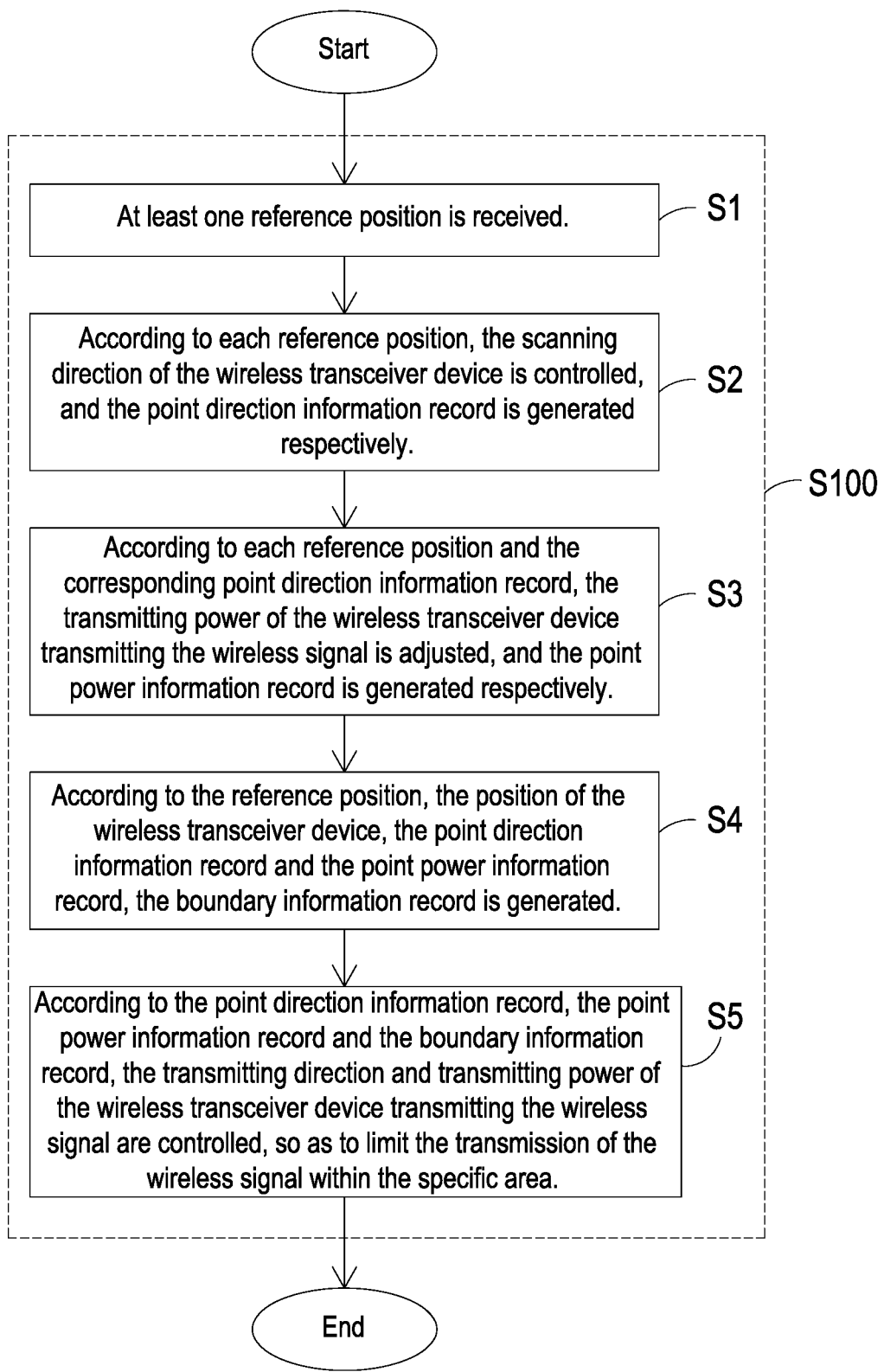
FIG. 7 is a flowchart illustrating a wireless communication method according to an embodiment of the present application.

FIG. 7 is a flowchart illustrating a wireless communication method according to an embodiment of the present application. The wireless communication method of FIG. 7 is applied to the wireless communication system 1 of FIG. 1. The wireless communication method includes the following steps.

Firstly, at least one reference position is received (Step S1). Preferably but not exclusively, the reference position is acquired via the position signal transmitted by the boundary setting device.

Then, according to each reference position, the scanning direction of the wireless transceiver device 10 is controlled, and the point direction information record is generated respectively (Step S2).

Then, according to each reference position and the corresponding point direction information record, the transmitting power of the wireless transceiver device 10 transmitting the wireless signal is adjusted, and the point power information record is generated respectively (Step S3).

Afterward, according to the reference position, the position of the wireless transceiver device, the point direction information record and the point power information record, the boundary information record is generated (Step S4).

Finally, according to the point direction information record, the point power information record and the boundary information record, the transmitting direction and transmitting power of the wireless transceiver device 10 transmitting the wireless signal are controlled, so as to limit the transmission of the wireless signal within the specific area (Step S5). In an embodiment, another action (e.g., detection and communication) is performed after the step S5.

In an embodiment, the wireless communication method further includes the step to examine whether the request of switching band is received. If the examining result is satisfied, the band of the wireless signal is switched, and the step S3 is repeated. If the examining result is not satisfied, the succeeding step is performed. This step is performed between the step S2 and the step S3, performed between the step S3 and the step S4, performed between the step S4 and the step S5, or performed after the step S5.

Figure 8:
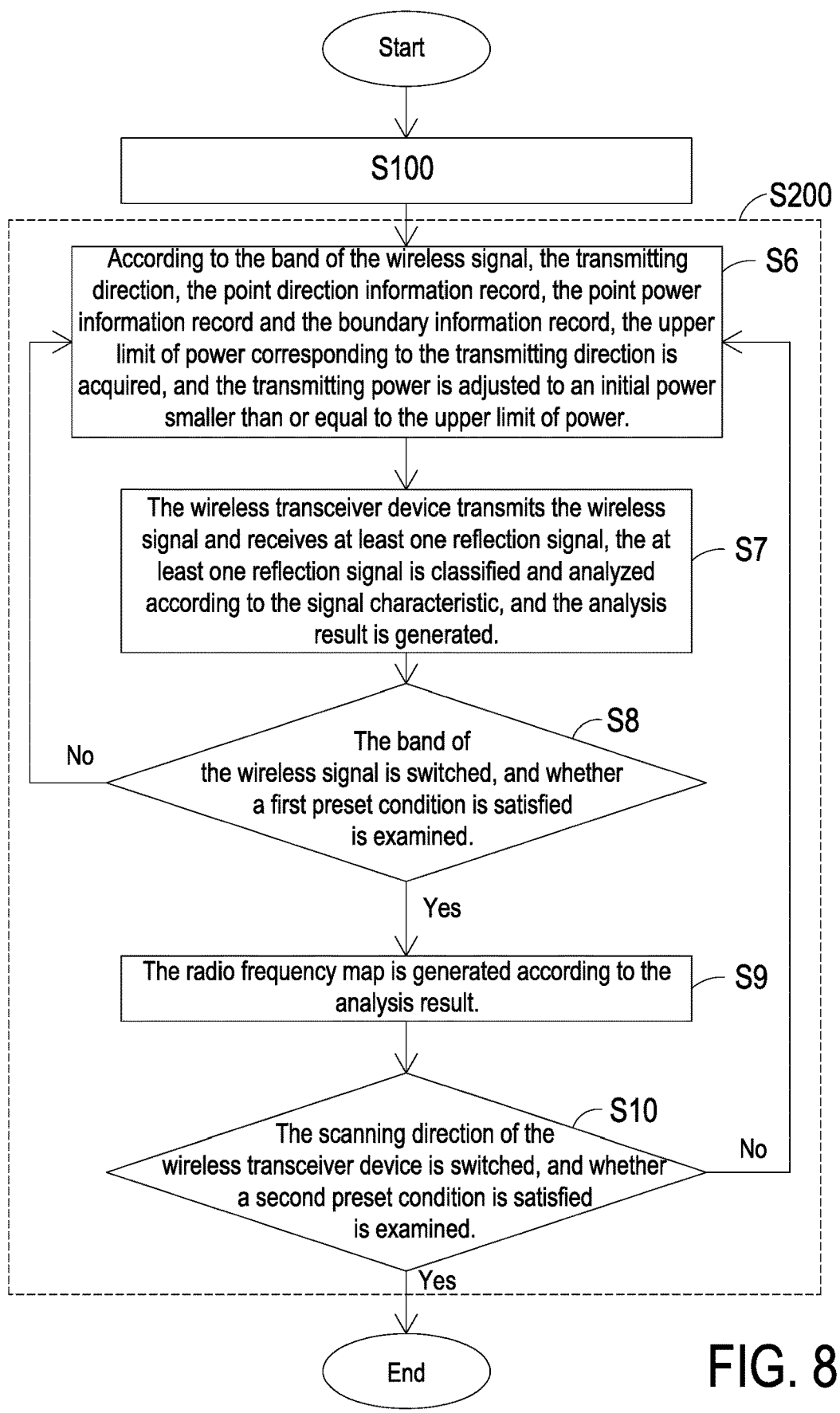
FIG. 8 is a flowchart illustrating a wireless communication method according to another embodiment of the present application.

FIG. 8 is a flowchart illustrating a wireless communication method according to another embodiment of the present application. The wireless communication method of this embodiment is applied to the wireless communication system 1 of FIG. 1. The steps corresponding to those of FIG. 7 are designated by identical numeral references, and detailed descriptions thereof are omitted. Compared with the wireless communication method of FIG. 7, the wireless communication method of FIG. 8 further includes the following steps.

According to the band of the wireless signal, the transmitting direction, the point direction information record, the point power information record and the boundary information record, the upper limit of power corresponding to the transmitting direction is acquired, and the transmitting power is adjusted to an initial power, where the initial power is smaller than or equal to the upper limit of power (Step S6). The upper limit of power is the transmitting power of the wireless transceiver device 10 transmitting the wireless signal to the corresponding point or boundary. Each transmitting direction has a corresponding upper limit of power, and the upper limit of power changes as the band of the wireless signal changes.

The wireless transceiver device 10 transmits the wireless signal and receives at least one reflection signal, the at least one reflection signal is classified and analyzed according to the signal characteristic, and the analysis result is generated (Step S7). In an embodiment, the reflection signal is for example but not limited to be classified according to the transmitting power corresponding to the power of the reflection signal. In an embodiment, the reflection signal is generated from the wireless signal reflected by at least one physical entity. The analysis result presents the physical characteristic of the physical entity.

The band of the wireless signal is switched, and whether a first preset condition is satisfied is examined (Step S8). If the examining result is satisfied, the succeeding step is performed. If the examining result is not satisfied, the step S6 is repeated. In an embodiment, the first preset condition is that the number of switching the band of the wireless signal is larger than the upper limit of the number of switching band. The upper limit of the number of switching band is larger than or equal to one, and the upper limit of the number of switching band is determined by the number of the band applied by the wireless communication system 1.

The radio frequency map is generated according to the analysis result (Step S9).

The scanning direction of the wireless transceiver device 10 is switched, and whether a second preset condition is satisfied is examined (Step S10). If the examining result is satisfied, the succeeding step is performed. If the examining result is not satisfied, the step S6 is repeated. In an embodiment, the second preset condition is that the number of switching the scanning direction of the wireless transceiver device 10 is larger than the upper limit of the number of switching direction. The upper limit of the number of switching direction is larger than or equal to zero. The larger the upper limit of the number of switching direction is, the higher the accuracy of detecting and locating the physical entity is.

In an embodiment, the wireless communication method further includes the step of increasing the transmitting power and examining whether the increased transmitting power is larger than the upper limit of power. If the examining result is satisfied, the succeeding step is performed. If the examining result is not satisfied, the step S7 is repeated. This step can be performed between the step S7 and the step S8, performed between the step S8 and the step S9, performed between the step S9 and the step S10, or performed after the step S10.

In an embodiment, before performing the step S6, the scanning direction of the wireless transceiver device 10 is adjusted to an initial direction, and the band of the wireless signal is adjusted to an initial band.

Figure 9:
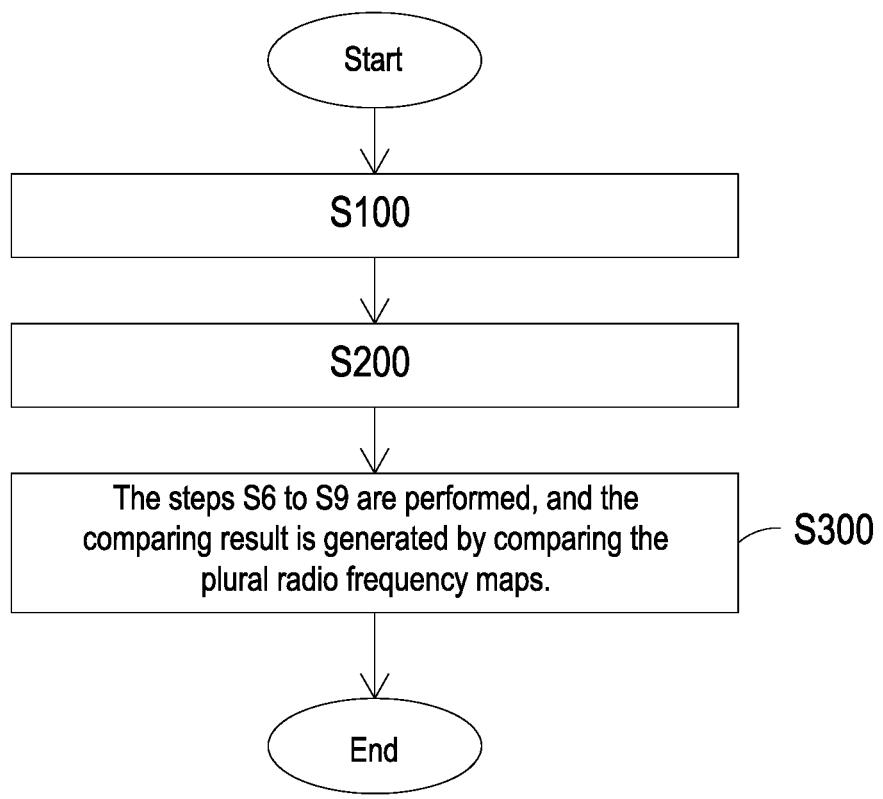
FIG. 9 is a flowchart illustrating a wireless communication method according to another embodiment of the present application.

FIG. 9 is a flowchart illustrating a wireless communication method according to another embodiment of the present application. The wireless communication method of this embodiment is applied to the wireless communication system 1 of FIG. 1. The steps corresponding to those of FIG. 8 are designated by identical numeral references, and detailed descriptions thereof are omitted. Compared with the wireless communication method of FIG. 8, the wireless communication method of FIG. 9 further includes the step of performing the steps S6 to S9, comparing the plural radio frequency maps and generating a comparing result (Step S300). In an embodiment, the position variation of the physical entity is acquired according to the comparing result.

Figure 10:
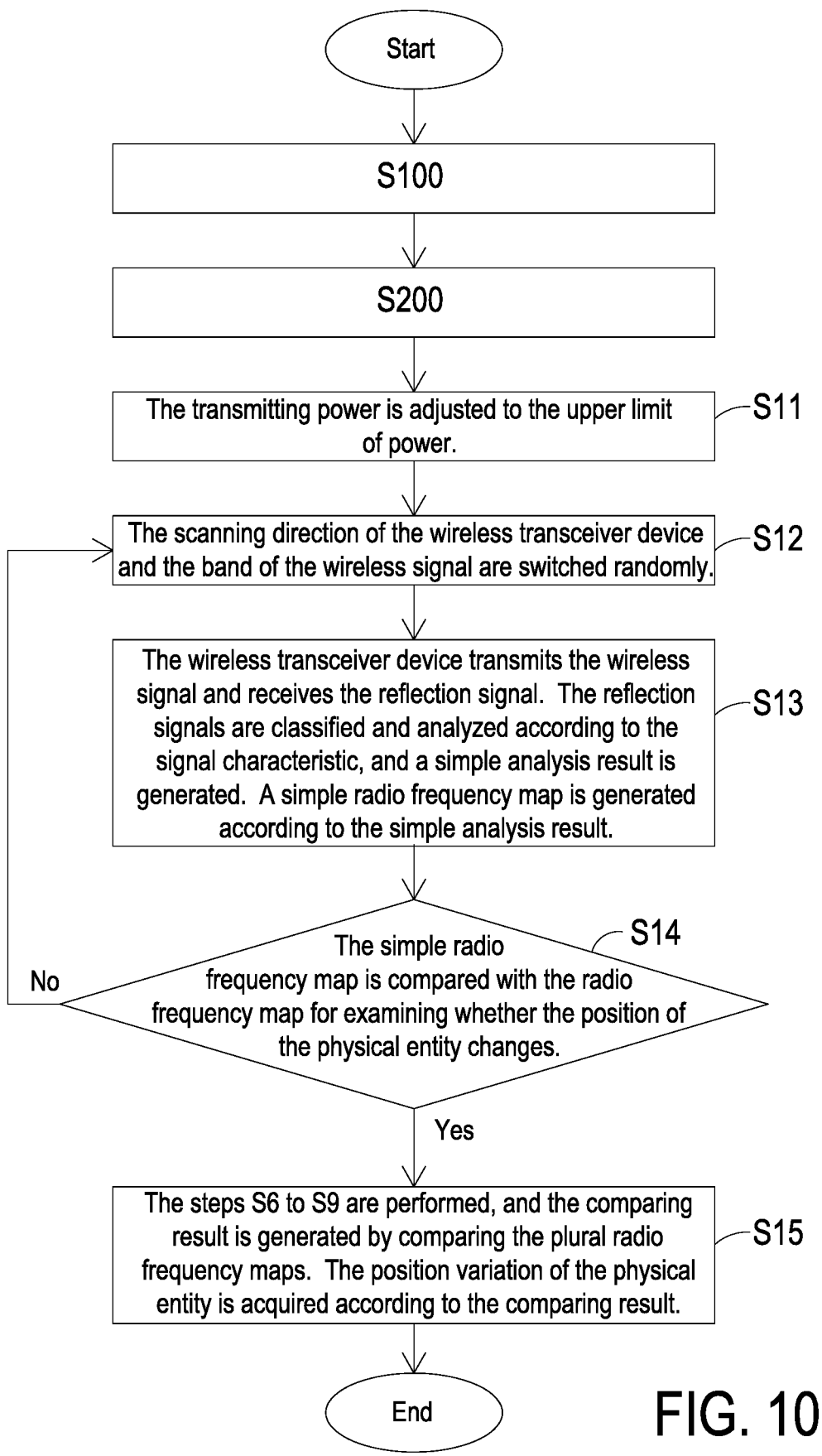
FIG. 10 is a flowchart illustrating a wireless communication method according to another embodiment of the present application.

FIG. 10 is a flowchart illustrating a wireless communication method according to another embodiment of the present application. The wireless communication method of this embodiment is applied to the wireless communication system 1 of FIG. 1. The steps corresponding to those of FIG. 8 are designated by identical numeral references, and detailed descriptions thereof are omitted. Compared with the wireless communication method of FIG. 8, the wireless communication method of FIG. 10 further includes the following steps.

The transmitting power is adjusted to the upper limit of power (Step S11).

The scanning direction of the wireless transceiver device 10 and the band of the wireless signal are switched randomly (Step S12).

The wireless transceiver device 10 transmits the wireless signal and receives the reflection signal. The reflection signals are classified and analyzed according to the signal characteristic, and a simple analysis result is generated. A simple radio frequency map is generated according to the simple analysis result (Step S13). The simple radio frequency map is generated based on one single transmitting power, one single scanning direction and one single band of the wireless signal. Therefore, compared with the radio frequency map generated by the step S9, the accuracy of the simple radio frequency map generated by the step S13 is lower.

The simple radio frequency map is compared with the radio frequency map for examining whether the position of the physical entity changes (Step S14). If the examining result is satisfied, the succeeding step is performed. If the examining result is not satisfied, the step S12 is repeated.

The steps S6 to S9 are performed, and the comparing result is generated by comparing the plural radio frequency maps. The position variation of the physical entity is acquired according to the comparing result (Step S15). Any of the radio frequency maps can be stored and set as a basis of comparison according to the actual requirements.

From the above descriptions, the present disclosure provides a wireless communication system and method. According to each reference position, the processing device of the wireless communication system generates corresponding point direction information record and point power information record respectively. The boundary information record is generated accordingly. In accordance with the point direction information record, the point power information record and the boundary information record, the processing device controls the wireless transceiver device to transmit the wireless signal with corresponding transmitting direction and transmitting power. Consequently, the transmission of the wireless signal is limited within a specific area. In addition, the wireless communication system and method transmit the wireless signal and receives the reflection signal thereof, so as to build the radio frequency map. Therefore, the physical entity in the transmission area of the wireless signal is identified and located, and the area monitoring is realized. Moreover, the wireless communication system and method acquire the variation of the position of the physical entity in the wireless transmission area by comparing the radio frequency maps at different time, and even acquire the moving path of the physical entity via several times of position varying. Consequently, the intensity of area monitoring is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless communication system, comprising:
a wireless transceiver device configured for transmitting a wireless signal with a transmitting power and a transmitting direction and detecting in a scanning direction; and
a processing device connected with the wireless transceiver device, wherein the processing device receives at least one reference position and comprises:
a direction control module configured for controlling the transmitting direction and the scanning direction, wherein the direction control module controls the scanning direction and generates a point direction information record according to each of the at least one reference position respectively;
a power adjusting module configured for dynamically adjusting the transmitting power, wherein the power adjusting module adjusts the transmitting power and generates a point power information record according to each of the at least one reference position and the corresponding point direction information record respectively; and
a boundary setting module, wherein the boundary setting module receives the at least one reference position, a position of the wireless transceiver device, the point direction information record(s) and the point power information record(s), and the boundary setting module generates a boundary information record,
wherein the processing device controls the transmitting direction and the transmitting power according to the point direction information record(s), the point power information record(s) and the boundary information record, so as to limit a transmission of the wireless signal within a specific area.

2. The wireless communication system according to claim 1, further comprising at least one boundary setting device configured for transmitting a position signal, wherein the wireless transceiver device receives the position signal and outputs the position signal to the processing device.

3. The wireless communication system according to claim 2, wherein the processing device controls the wireless transceiver device to detect for acquiring the reference position.

4. The wireless communication system according to claim 2, wherein the position signal presents the reference position, and the processing device acquires the reference position via the position signal.

5. The wireless communication system according to claim 1, wherein the processing device further comprises a band switching module configured for switching a band of the wireless signal.

6. The wireless communication system according to claim 5, wherein the processing device further comprises:
- a signal classifying module, wherein the signal classifying module receives at least one reflection signal through the wireless transceiver device and classifies the at least one reflection signal according to a signal characteristic;
- a path analyzing module, wherein the path analyzing module receives and analyzes plural classified reflection signals, and the path analyzing module generates an analysis result; and
- a radio frequency mapping module, wherein the radio frequency mapping module receives the analysis result and generates a radio frequency map according to the analysis result.

7. The wireless communication system according to claim 6, wherein the signal classifying module classifies the at least one reflection signal according to the transmitting power corresponding to a power of the reflection signal.

8. The wireless communication system according to claim 6, wherein the at least one reflection signal is generated from the wireless signal reflected by at least one physical entity, and the analysis result presents a physical characteristic of the at least one physical entity.

9. The wireless communication system according to claim 6, wherein the direction control module controls the wireless transceiver device to transmit the wireless signal and receive the reflection signal in plural directions, the wireless signal in each of the plural directions has plural bands by switching of the band switching module, and the power adjusting module controls the wireless transceiver device to transmit the wireless signal with plural transmitting powers in each of the plural bands respectively.

10. The wireless communication system according to claim 9, wherein the processing device further comprises a band comparing module, the band comparing module receives the plural classified reflection signals, compares the plural reflection signals according to the plural bands, and generates a contrast result, and the radio frequency mapping module receives the analysis result and the contrast result and generates the radio frequency map according to the analysis result and the contrast result.

11. The wireless communication system according to claim 6, wherein the processing device further comprises:
- a map comparing module, wherein the map comparing module receives and compares the plural radio frequency maps generated by the radio frequency mapping module, and the map comparing module generates a comparing result; and
- an event examining module, wherein the event examining module receives the comparing result and acquires a variation of the radio frequency map according to the comparing result.

12. A wireless communication method, comprising:
(a) receiving at least one reference position;
(b) controlling a scanning direction of a wireless transceiver device and generating a point direction information record according to each of the at least one reference position respectively;
(c) adjusting a transmitting power of the wireless transceiver device transmitting a wireless signal and generating a point power information record according to each of the at least one reference position and the corresponding point direction information record respectively;
(d) generating a boundary information record according to the at least one reference position, a position of the wireless transceiver device, the point direction information record(s) and the point power information record(s); and
(e) controlling a transmitting direction and the transmitting power of the wireless transceiver device transmitting the wireless signal according to the point direction information record(s), the point power information record(s) and the boundary information record, and limiting a transmission of the wireless signal within a specific area.

13. The wireless communication method according to claim 12, wherein in the step (a), at least one position signal is received, the reference position is acquired via the position signal, and the position signal presents the reference position.

14. The wireless communication method according to claim 12, wherein in the step (a), at least one position signal is received, and the wireless transceiver device is controlled to detect for acquiring the reference position.

15. The wireless communication method according to claim 12, further comprising a step to examine whether a request of switching band is received, wherein if the examining result is satisfied, a band of the wireless signal is switched, and the step (c) is performed.

16. The wireless communication method according to claim 12, further comprising steps of:
(f) acquiring an upper limit of power corresponding to the transmitting direction according to a band of the wireless signal, the transmitting direction, the point direction information record, the point power information record and the boundary information record, and adjusting the transmitting power to an initial power smaller than or equal to the upper limit of power;
(g) transmitting the wireless signal and receiving at least one reflection signal by the wireless transceiver device, classifying and analyzing the at least one reflection signal according to a signal characteristic, and generating an analysis result;
(h) switching the band of the wireless signal, and examining whether a first preset condition is satisfied, wherein if the examining result is satisfied, the succeeding step is performed, and if the examining result is not satisfied, the step (f) is repeated;
(i) generating a radio frequency map according to the analysis result; and
(j) switching the scanning direction, and examining whether a second preset condition is satisfied, wherein if the examining result is not satisfied, the step (f) is repeated.

17. The wireless communication method according to claim 16, wherein in the step (g), the at least one reflection signal is classified according to the transmitting power corresponding to a power of the reflection signal.

18. The wireless communication method according to claim 16, further comprising a step of increasing the transmitting power and examining whether the increased transmitting power is larger than the upper limit of power, wherein if the examining result is not satisfied, the step (g) is performed.

19. The wireless communication method according to claim 16, wherein the first preset condition is that a number of switching the band of the wireless signal is larger than an upper limit of switching band, which the upper limit of switching band is larger than or equal to one.

20. The wireless communication method according to claim 16, wherein the second preset condition is that a number of switching the scanning direction is larger than an upper limit of switching direction, which the upper limit of switching direction is larger than or equal to zero.

21. The wireless communication method according to claim 16, further comprising a step of performing the step (f) to the step (i), comparing the plural radio frequency maps and generating a comparing result.

22. The wireless communication method according to claim 16, wherein the at least one reflection signal is generated from the wireless signal reflected by at least one physical entity, and the analysis result presents a physical characteristic of the at least one physical entity.

23. The wireless communication method according to claim 22, further comprising steps of:
- (k) adjusting the transmitting power to the upper limit of power;
- (m) switching the scanning direction and the band of the wireless signal randomly;
- (n) transmitting the wireless signal and receiving the at least one reflection signal by the wireless transceiver device, classifying and analyzing the at least one reflection signal according to a signal characteristic, generating a simple analysis result, and generating a simple radio frequency map according to the simple analysis result;
- (o) comparing the simple radio frequency map and the radio frequency map, and examining whether a position of the at least one physical entity is changed, wherein if the examining result is satisfied, the succeeding step is performed, and if the examining result is not satisfied, the step (m) is repeated; and
- (p) performing the step (f) to the step (i), generating a comparing result by comparing the radio frequency maps, and acquiring a position variation of the at least one physical entity according to the comparing result.

* * * * *